US011376911B2

(12) United States Patent
Friesen et al.

(10) Patent No.: US 11,376,911 B2
(45) Date of Patent: Jul. 5, 2022

(54) SPRING CONTROL ARM

(71) Applicant: Benteler Automobiltechnik GmbH, Paderborn (DE)

(72) Inventors: Dieter Friesen, Paderborn (DE); Oliver Mielke, Altenbeken (DE); Stephan Meyer, Bielefeld (DE); Jürgen Hummelt, Paderborn (DE); Thomas Klee, Krauthausen (DE); Manfred Bürger, Bad Wünnenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 2 days.

(21) Appl. No.: 16/837,703

(22) Filed: Apr. 1, 2020

(65) Prior Publication Data
US 2020/0317013 A1   Oct. 8, 2020

(30) Foreign Application Priority Data

Apr. 2, 2019   (DE) .................... 10 2019 108 548.9

(51) Int. Cl.
*B60G 7/00*   (2006.01)
(52) U.S. Cl.
CPC ........ *B60G 7/001* (2013.01); *B60G 2204/143* (2013.01); *B60G 2206/16* (2013.01); *B60G 2206/722* (2013.01)
(58) Field of Classification Search
CPC .............. B60G 7/001; B60G 2206/722; B60G 2206/16; B60G 2204/143; B60G 2206/8103; B60G 7/02; B60G 2204/10
See application file for complete search history.

(56) References Cited

U.S. PATENT DOCUMENTS

| 7,387,307 | B2 * | 6/2008 | Tanaka | B60G 3/202 280/124.135 |
| 9,090,138 | B2 | 7/2015 | Haselhorst et al. | |
| 9,895,947 | B2 * | 2/2018 | Meyer | B60G 11/16 |
| 2012/0299263 | A1 * | 11/2012 | Mielke | B60G 7/001 280/124.134 |

(Continued)

FOREIGN PATENT DOCUMENTS

| DE | 102004009722 | 9/2005 |
| DE | 102011053927 | 3/2013 |

(Continued)

*Primary Examiner* — Darlene P Condra
(74) *Attorney, Agent, or Firm* — Henry M. Feiereisen LLC

(57) ABSTRACT

A spring control arm for a wheel suspension of a motor vehicle is formed as a single-shell, essentially U-shaped sheet metal part and includes a back, spaced-apart side walls adjoining the back and each having an upper side wall region connected to the back, a lower side wall region distal from the back, and a central side wall region arranged between the upper and lower side wall regions. The spring control arm has first and a second end sections for attachment and a wider spring plate region disposed therebetween. The spring control arm has a substantially omega-shaped cross section in the spring plate region, which is more pronounced in a central longitudinal section due to outwardly projecting upper side wall sections than in an end longitudinal section of the spring plate region.

10 Claims, 10 Drawing Sheets

(56) References Cited

U.S. PATENT DOCUMENTS

| | | | | |
|---|---|---|---|---|
| 2014/0300074 | A1* | 10/2014 | Koormann | B60G 7/001 |
| | | | | 280/124.151 |
| 2015/0008654 | A1* | 1/2015 | Haselhorst | B60G 7/001 |
| | | | | 280/124.128 |
| 2016/0280284 | A1* | 9/2016 | Scholz | B62D 25/2018 |
| 2017/0057313 | A1* | 3/2017 | Paulsen | B33Y 10/00 |
| 2017/0203624 | A1* | 7/2017 | Mielke | B60G 7/02 |
| 2019/0092115 | A1* | 3/2019 | Paulsen | B60G 7/001 |
| 2019/0127001 | A1* | 5/2019 | Traylor | B62D 65/12 |
| 2019/0263207 | A1* | 8/2019 | Krolo | B21D 28/32 |
| 2019/0291522 | A1* | 9/2019 | Leimkuhler | B60G 13/005 |
| 2020/0247204 | A1* | 8/2020 | Fortmeier | B60G 7/02 |

FOREIGN PATENT DOCUMENTS

| | | |
|---|---|---|
| DE | 102018201657 | 8/2019 |
| EP | 1 832 447 | 9/2007 |
| EP | 2 809 531 | 8/2016 |
| EP | 3 543 044 | 9/2019 |
| WO | WO 02/24429 | 3/2002 |

* cited by examiner

SPRING CONTROL ARM

CROSS-REFERENCES TO RELATED APPLICATIONS

This application claims the priority of German Patent Application, Serial No. 10 2019 108 548.9, filed Apr. 2, 2019, pursuant to 35 U.S.C. 119(a)-(d), the content of which is incorporated herein by reference in its entirety as if fully set forth herein.

BACKGROUND OF THE INVENTION

The present invention relates to a spring control arm for a wheel suspension of a motor vehicle.

The following discussion of related art is provided to assist the reader in understanding the advantages of the invention, and is not to be construed as an admission that this related art is prior art to this invention.

Spring control arms are essentially rigid components that are used to support the wheel on the chassis of a chassis system and to guide the wheel in one or more directions. In the case of a rod-shaped control arms with two articulated end sections, a spring plate for a suspension spring, a shock absorber or a spring-shock absorber element are located between its end sections. Spring control arms should have the highest possible stability and rigidity, in particular a high section modulus combined with low weight and installation space. Spring control arms are mostly made of steel. Spring control arms made as one-piece sheet metal parts are known.

It would be desirable and advantageous to obviate prior art shortcomings and to provide an improved spring control arm which can be produced inexpensively in a single-shell construction from a steel sheet and has a high section modulus with the lowest possible weight.

SUMMARY OF THE INVENTION

According to one aspect of the present invention, a spring control arm is made as a single shell formed sheet metal part from a sheet steel. The spring control arm has an essentially U-shaped cross section. The U-shaped cross-section is composed of a back, which in the installed position is located on the top side. Side walls produced by sheet metal forming join the back on both sides. The two side walls are spaced apart. Each of the side walls is divided into three sections: An upper (or top) side wall section connects to the back. A side wall region located distal from the common back is the lower (or bottom) side wall region. The central side wall region is located in between.

The rod-shaped spring control arm has a first end section and a second end section for fastening the spring control arm to the chassis or to the wheel carrier. The rod-shaped spring control arm is in particular part of a multi-control arm axle, in particular a five-control arm axle. The spring control arm can be used in particular as the lower, rear transverse control arm of a five-control arm rear axle.

In the installed position, a spring, in particular a spring of a rear axle, acts on the spring control arm. In addition, a damper can also be supported indirectly or directly on the spring control arm. An indirect support or connection between the spring control arm and spring and/or damper is possible by arranging a spring pad operating as a clutch or an adapter between the spring control arm and the spring or the damping element, which is adapted to the respective spring design. A spring pad for an air spring and as an alternative, a spring pad for a helical compression spring and for an associated damper may be provided. For this purpose, a spring plate region is located between the end sections of the spring control arm. The region of the spring plate is enlarged compared to other longitudinal sections of the spring control arm. In the invention, the spring plate region as viewed in the vertical direction is also wider than other height regions of the spring control arm in the same cross-section plane.

The spring control arm should be as compact, light as possible and therefore slim. A spring can be wider than a rod-shaped transverse control arm. In the invention, however, material and thus weight are saved in that only the back intended for support is widened, but not the lower part of the spring control arm facing away from the back or the end sections. At the same time, the transitions from the spring plate region to the adjacent, summer regions are smooth and not sudden. This prevents stress peaks.

The spring control arm according to the invention has a special cross section which is essentially omega-shaped in the spring plate region. The omega shape varies along the length of the spring plate region, i.e. in the longitudinal direction of the spring control arm. The omega shape is more pronounced in a central longitudinal section of the spring plate region due to upper side wall sections which are flared more outward than in at least one longitudinal end section of the spring plate region. This creates a smooth transition from the remaining longitudinal sections of the straight side walls, i.e. the side walls perpendicular to the back that are not omega shaped. The spring plate region is designed to meet specific requirements, i.e. it does not have to be circular, but can have an essentially elliptical, teardrop-shaped or egg-shaped shape, With this shape, the transitions to the adjacent longitudinal sections are rounded so as to be stress-free.

Advantageously, the central side wall regions may be deformed as little as possible and extend substantially straight from one end-side longitudinal section of the spring plate region to the other end-side longitudinal section of the spring plate region, while the upwardly adjoining upper side wall regions, depending on the width of the spring plate region, project still farther outwardly towards the center of the spring plate region. Material is saved by virtue of the straight course of the side walls in the central side wall region, while at the same time generating a high section modulus. In combination with the structured upper and lower side wall sections, the central side wall section also has a high section modulus against transverse forces, thus preventing pumping movements of the side walls under changing loads. This in turn prevents stress peaks, which in turn reduces edge stresses. As a result, the spring control arm has a longer service life.

According to another advantageous feature of the present invention, the course of the central side wall regions can be substantially straight in the longitudinal direction of the spring control arm. Substantially straight in this context is to be understood to mean that the side walls extend straight hi the respective functional regions, i.e. in the end sections for attaching the spring control arm, as well as in the spring plate region. Between these three functional regions, transition regions may exist in which the side walls may be slightly curved when transitioning to the next, adjoining region.

The distances between the side walls in the two end regions can have different sizes. In particular, the distance for pressing the bearing sleeve in can be relatively small in a first end section. Another fastening method can be provided on the opposite, second end section of the spring control arm, for example by inserting screw bolts into calibrated openings in order to attach between them a stationary element of a bearing seat. The distance between the side walls can here be chosen slightly larger.

However, since the walls extend parallel to each other in the region of each bearing seat, a spring control arm with end sections of different width and essentially straight side walls must have two smaller changes of direction in the longitudinal direction, which in particular are not located within the respective functional region, but rather in the transition regions to the respective end sections. Overall, the side walls are therefore essentially straight in their respective longitudinal direction.

According to another advantageous feature of the invention, the central side wall regions can also be oriented substantially perpendicular to the spring plate. The central side wall regions of the substantially U-shaped spring control arm are free of bends in the vertical direction. According to the invention, the central side wall regions are arranged perpendicular to the flanges and perpendicular to the spring plate and form the link between the upper and lower side wall regions. While the upper side wall region is inevitably curved around an axis of curvature, which is essentially oriented in the longitudinal direction of the spring control arm, due to the different lateral shapes and the transition to the spring plate, such pronounced curvatures about the longitudinal axis in the central side wall regions should be avoided as much as possible with the present invention. The lower side wall regions, which preferably have flanges projecting outward in opposite directions, necessarily also have curvatures. Depending on the longitudinal section, these flanges have a hat-shaped or an omega-shaped cross-section. It has been observed that the load-bearing capacity of the spring control arm can be improved when the central side wall regions are as orthogonal or perpendicular to the spring plate as possible.

Of particular importance are the upper side wall regions, which protrude relatively far outwards depending on the longitudinal section and can determine the maximum width of the entire spring control arm in a central longitudinal section of the spring plate region. In order to minimize stress, the transition between the central side wall region and the spring plate region should be provided with large bending radii, if possible. The upper side wall regions hence do not connect to the spring plate region with the narrowest possible 90° downward bend in the vertical direction, but rather connect with an outward protrusion, tangentially in the transverse direction as a continuation to the plane of the spring plate region, so as to create a transition to the central side wall regions with a large, inwardly directed arc. The term omega-shaped means in the context of the invention that the cross-section resembles the capital letter Omega of the Greek alphabet, which has an upper, bulging part with an opening on the underside, with ones pointing on both sides of the opening in the horizontal direction, which analogous correspond to the flanges on the cross section of the spring control arm. In the present invention, the lateral bulges in the spring plate region result from the large radii of the upper side wall regions. The cross-sectional contour can also be called omega-shaped because the spring plate region is not rounded, but flattened.

In particular, the spring control arm is mirror-symmetrical in relation to its central longitudinal axis, so that the bulges on both sides in the upper side wall sections cause the omega-shaped form of the spring control arm in cross section.

The cross section of the spring control arm is omega-shaped only in the spring plate region. A U-shaped or hat-shaped longitudinal section with outwardly facing flanges connects to the omega-shaped spring plate region. The bending radii in this U-shaped or hat-shaped longitudinal section are not necessarily smaller than in the spring plate region; however, the back of the spring control arm becomes narrower here. As a result, there are no laterally protruding, upper side wall regions. Rather, with a hat-shaped cross section, the side walls can run perpendicular to the back, and the outwardly projecting flanges can also extend perpendicular to the side walls and thus parallel to the back.

According to another advantageous feature of the present invention, the side walls at one end section of the spring control arm can have a greater distance from one another than at the other end section of the spring control arm. The side walls extend substantially straight between the end sections, in particular with respect to the central side wall regions. The end sections can have aligned passages or bores. Bearing sleeves can be pressed into the passages.

One end section or both end sections may have a fork shape and thus form bearing receptacles into which bearing sleeves can be welded. In this case, the bearing sleeves are not inserted from the longitudinal side of the spring control arm, but rather from the end side of the spring control arm.

One or more openings may be arranged in the spring plate region. Spring pads may be arranged in the openings, for example for an air spring or a steel spring.

The spring control arm may have corrosion protection by means of a zinc coating and, if necessary, additional paint coats prepared, for example, by cathodic dip painting. Its surface can be blasted at least in some regions. The spring control arm may be made of sheet steel with a wall thickness of 2 to 5 mm, and in particular with a wall thickness of less than 4 mm. Preferably, the spring control arm may be made of high-strength, ferritic-bainitic (FB) hot rolled steels, in particular FB780 with a tensile strength of at least 780 N/mm$^2$.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
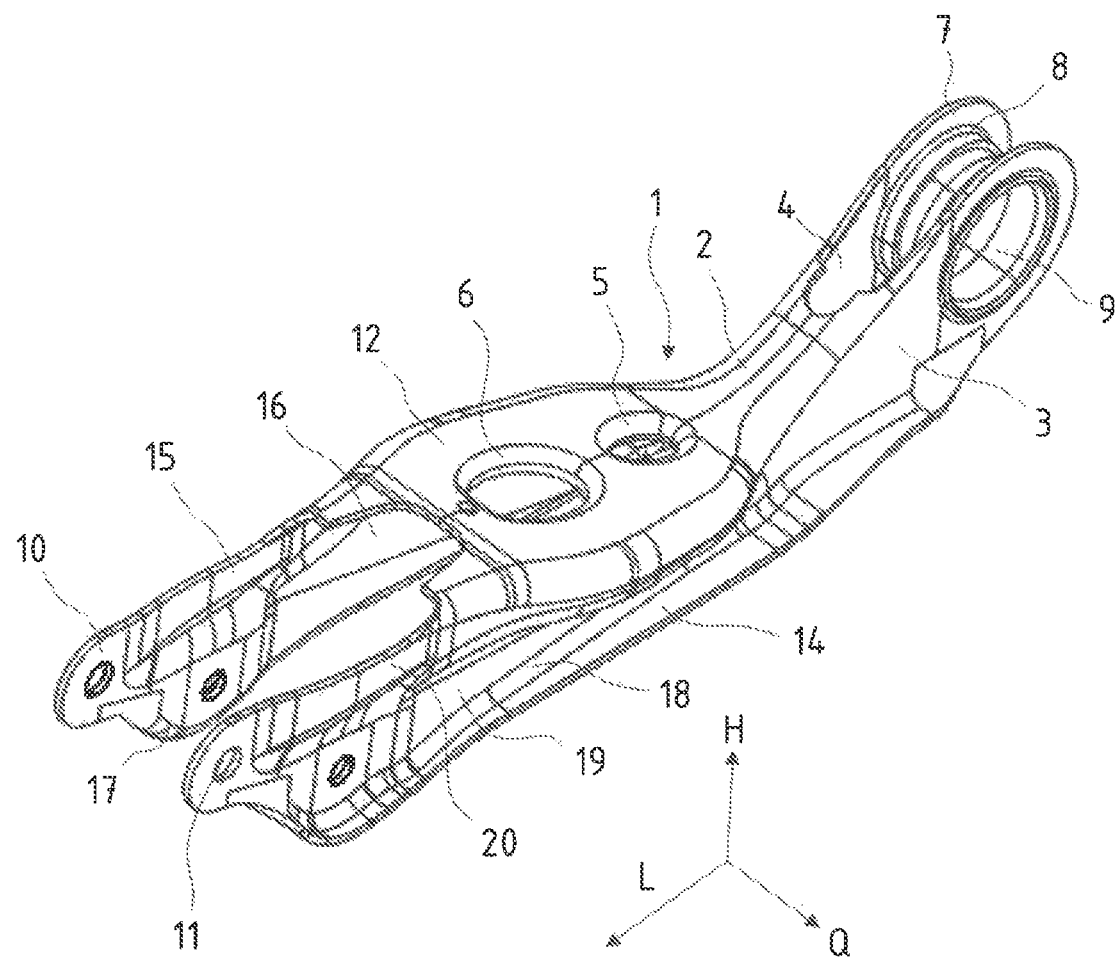
FIG. 1 shows a perspective view of one embodiment of a spring control arm according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 17:
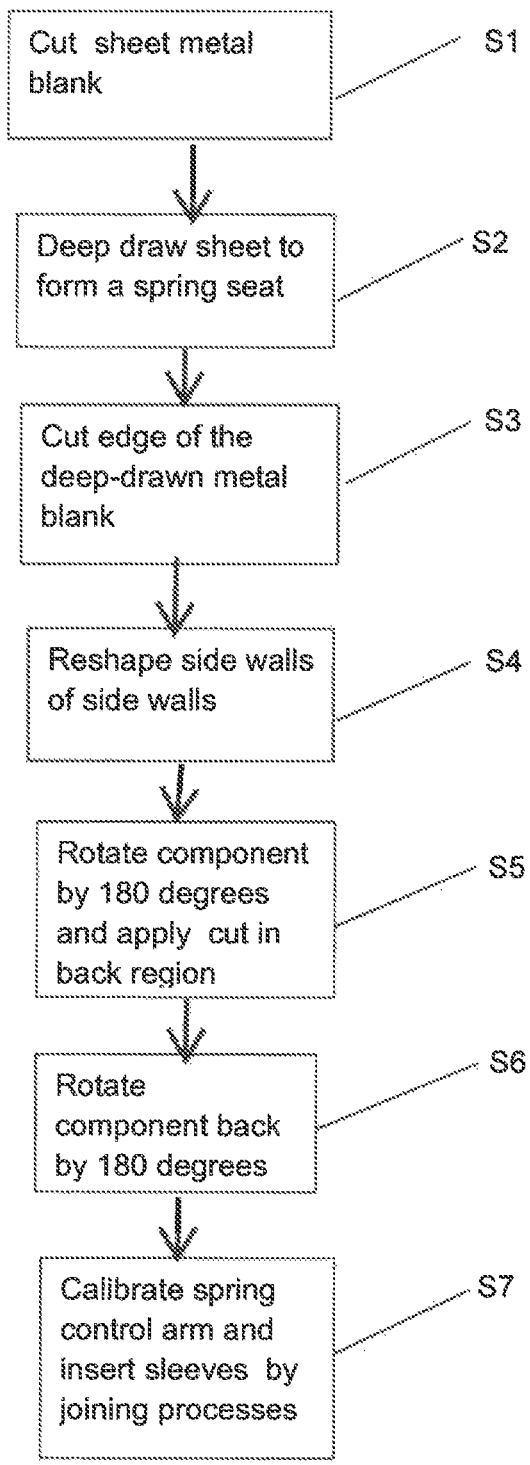
FIG. 17 shows a production sequence of eleven production steps S1 to S11 for producing the spring control arm of FIG. 1.

Turning now to the drawing, and in particular to FIG. 1, there is shown a perspective view of one embodiment of a spring control arm, generally designated by reference numeral 1. The spring control arm 1 is made of a sheet metal plate. A number of successive steps S1 to S7 of the production sequence of the spring control arm is shown in FIG. 17.

First, a sheet metal blank is cut (step S1). In step S2, the sheet metal blank is deep-drawn to form a spring seat with a width-widening rear wall. In step S3, the edge of the deep-drawn sheet metal blank is cut. In step S4, side walls of the essentially U-shaped spring control arm are oriented perpendicular to the spring seat by reshaping. In the subsequent step S5, a further cut is made in the region of the back. The component is then rotated by 180°. In the same way, it is rotated back to the starting position in the subsequent step S6. Subsequently, fork mounts for connection in an end region are formed by cutting or punching. The bearing mounts in one end region are calibrated and openings are formed. Lastly, the spring control arm is finally calibrated and sleeves are inserted by joining processes (step S7). Such a single-shell spring control arm made of a shaped sheet metal part made of sheet steel is shown in FIGS. 1 to 15 in different views and sections.

The spring control arm 1 has a back 2 which connects the side walls 3, 4 to one another. The side walls 3, 4 are spaced apart from one another over the entire length of the spring control arm 1, resulting in a U-shaped basic shape. The back 2 has different functional regions. In particular, the back 2 includes a widened region referred to as the spring plate region 12. In this exemplary embodiment, the spring plate region 12 has two openings 5, 6 with inwardly directed passages. The openings 5, 6 serve to receive an adapter plate (not shown in detail) for adapting to different types of springs, for example for an air suspension or a steel suspension.

The spring control arm 1 has options for connection with a wheel carrier, on the one hand, and with the vehicle body, on the other hand. This is a rod control arm with two pivot points at the end. Two bearing receptacles 8, which are calibrated with respect to each other and into which a bearing sleeve 9 is inserted, are located at the first end section 7 of the spring control arm 1. The bearing sleeve 9 serves to accommodate a rubber-metal bearing.

The side walls 3, 4 which have a greater distance from each other are located at the opposite end section 10. The end section 10 also has calibrated openings 11 for connection to the motor vehicle. The axes of the bearing sleeve 9 and of the openings 11 in the end sections, respectively, extend parallel to one another.

A longitudinal direction L of the spring element 1 extends from one end section 7 to the other end section 10. The transverse direction Q denotes, in relation to the spring control arm 1, the axis perpendicular to the longitudinal axis L and parallel to the longitudinal axis of the bearing sleeve 9 and the bearing receptacles 8, respectively. The vertical axis H is perpendicular to the transverse direction Q and to the longitudinal direction L and points upwards in FIG. 1. Accordingly, the terms top and bottom are used in relation to the spring control arm, and the terms longitudinal sections are used in relation to the longitudinal direction. References to the width refer to the transverse direction Q.

Figure 2:
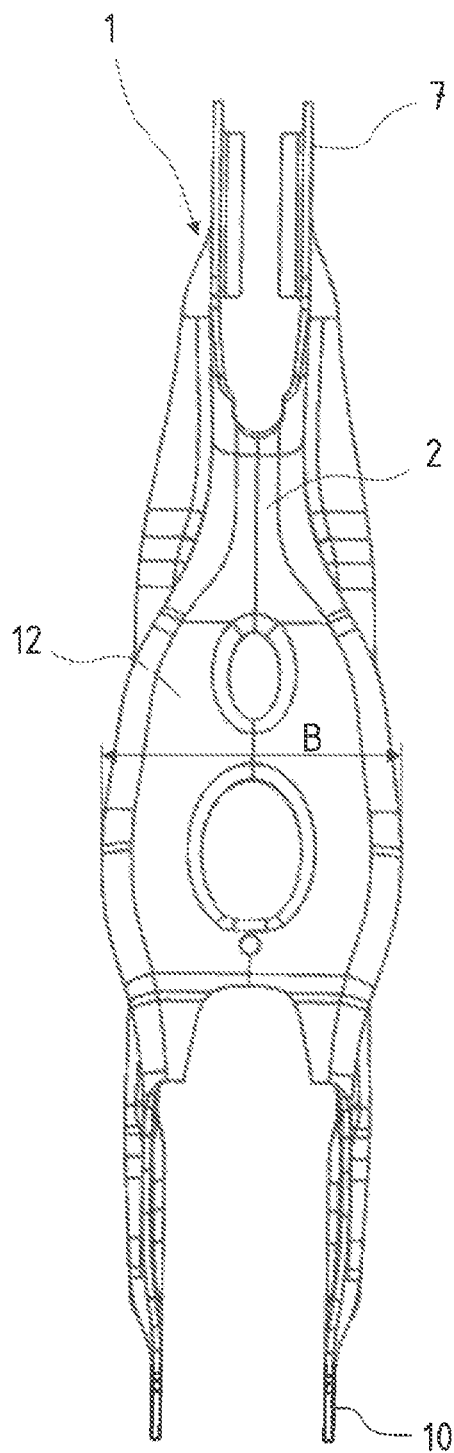
FIG. 2 shows the spring control arm of FIG. 1 in the view from above.

The spring plate region 12 is the widest region of the spring control arm 1, as viewed in the transverse direction Q. Its width B is not constant in the longitudinal direction L and increases as viewed from the respective end sections 7, 10 towards the center of the opening 6. The transitions to other longitudinal sections are smooth. In any case, the spring control arm 1 has the greatest width B in the spring plate region 12. In FIG. 2, the maximum width B of the spring plate region 12 is shown. The back 2, the component of which is the spring plate region 12, becomes significantly narrower, in particular toward the first end section 7.

Figure 5:
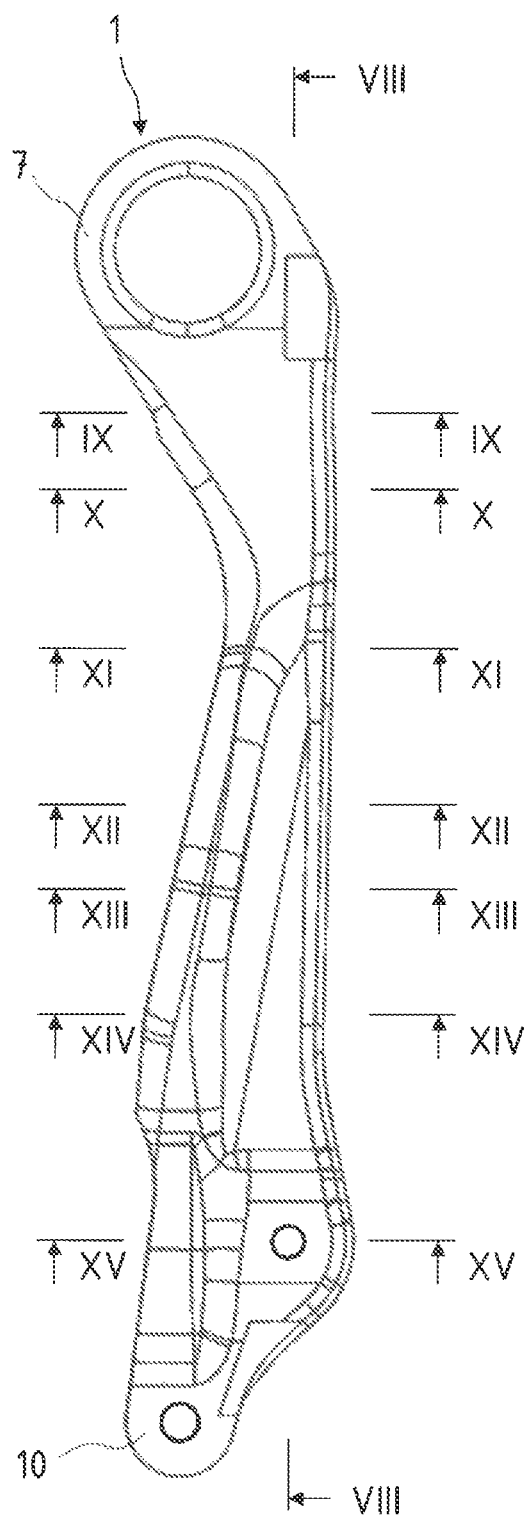
FIG. 5 shows the spring control arm of FIG. 1 in a view from the right.

From the view of the spring control arm 1 from below (FIG. 3), it can be seen that the width of the side walls 3, 4 with their flanges 13, 14 that point outwardly in opposite directions does not change much as the spring plate region 12. The spring plate region 12 extends over a length L1 (FIG. 3) of the spring control arm 1. The spring plate region 12 is characterized in that the cross section of the spring control arm 1 is substantially omega-shaped in the spring plate region 12. FIG. 5 shows the position of several cross-section planes which are shown in FIGS. 8 to 15.

Figure 14:
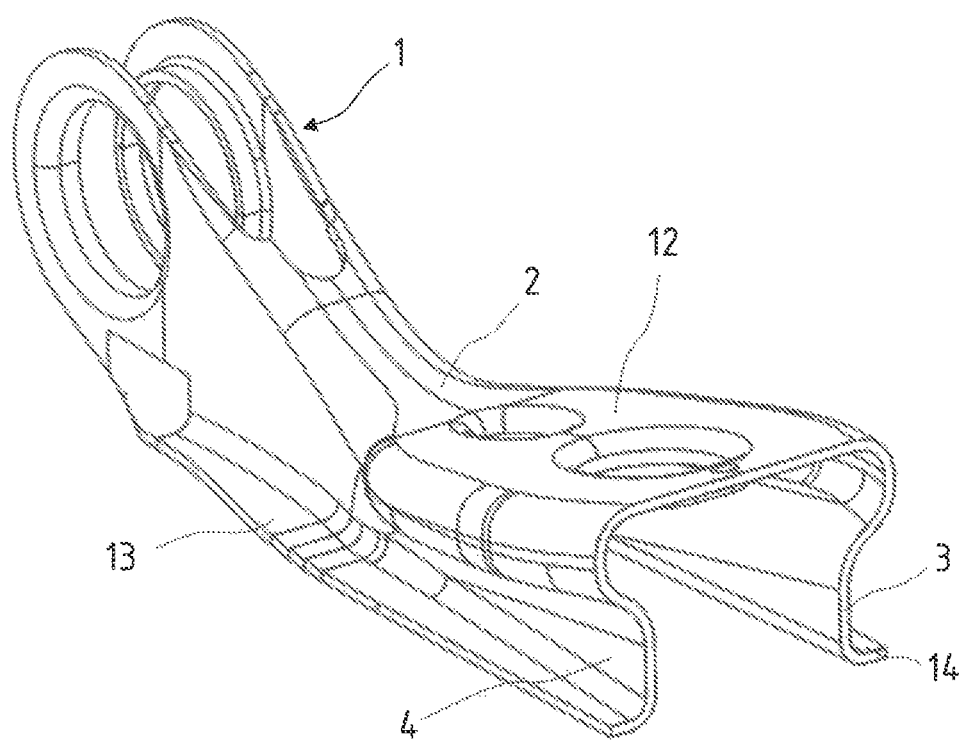
FIG. 14 shows a cross section along the section line XIV-XIV in FIG. 5.
Figure 15:
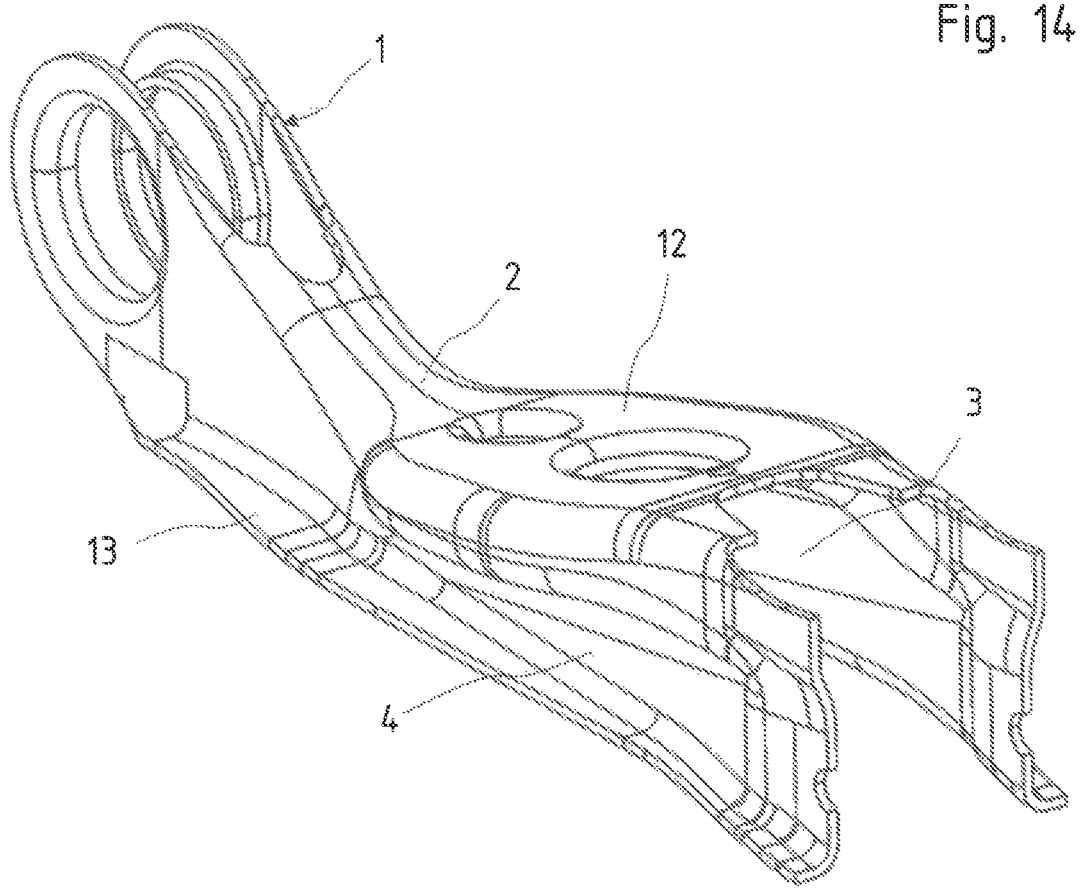
FIG. 15 shows a cross section along the section line XV-XV in FIG. 5.

The above-referenced omega shape of the cross section begins in the transition region between the cross sections X and XI (FIGS. 5, 10 and 11) and ends approximately in the section plane IX of FIG. 14. FIG. 15 does not show an omega-shaped section plane XV, because the back of the spring control arm 1 was removed in this region.

Figure 9:
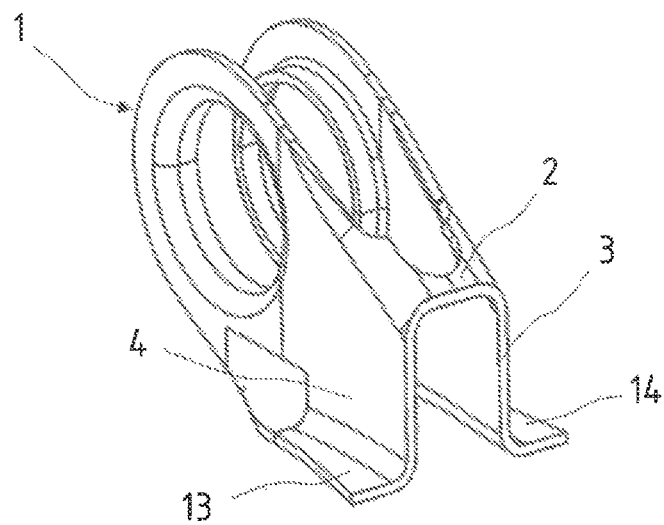
FIG. 9 shows a cross section along the section line IX-IX in FIG. 5.
Figure 10:
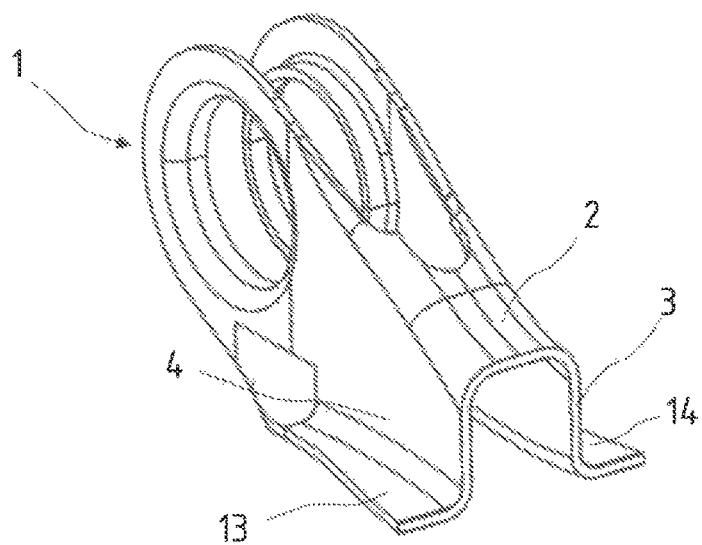
FIG. 10 shows a cross section along the section line XX in FIG. 5.
Figure 11:
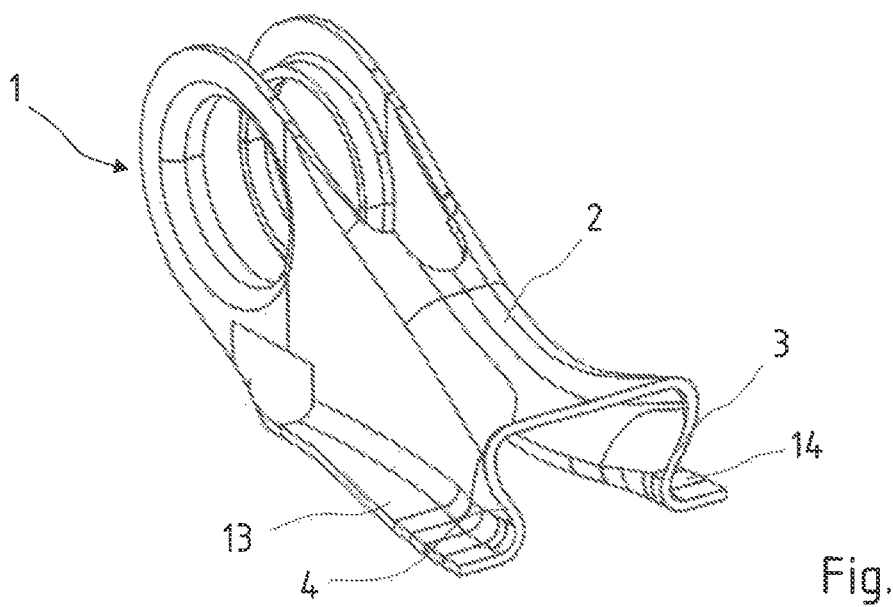
FIG. 11 shows a cross section along the section line XI-XI in FIG. 5.

FIGS. 9 and 10 show a hat-shaped profile in which the side walls 3, 4 with their flanges 13, 14 and the back 2 each form a sequence of bends at right angles to one another. The height of the side walls 3, 4 decreases from the section plane IX of FIG. 9 to the section plane X of FIG. 10. At the same time, the flanges 13, 14 become slightly wider. This hat-shaped cross section changes in the further course across the section planes XI to XIV, i.e. within the spring plate region 12. At the same time, the height of the side walls 3, 4 increases in the longitudinal direction L, as illustrated in the side view shown in FIGS. 4 and 5. The height of the spring control arm 1 is smallest between the section planes X and XI, i.e. where the spring plate region 12 begins. The height increases toward the second end section 10. The spring plate region 12 is therefore oriented at an angle with respect to the underside or to the flanges 13, 14 which extend essentially straight from one end section 7 to the other end section 10, with the exception of a downward-directed shape in the region of the opening 11 in the second end section 10.

Figure 4:
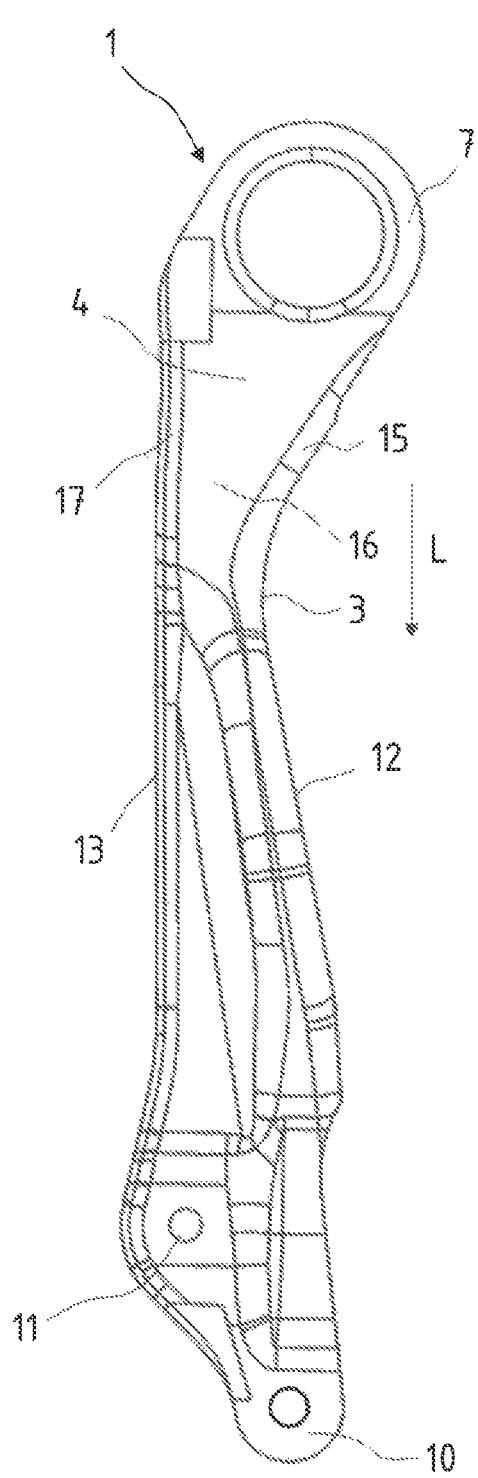
FIG. 4 shows the spring control arm of FIG. 1 in a view from the left.

It can also be seen from FIG. 4 that the side wall 4 is divided into three height sections: an upper side wall section 15 connects to the back 2. The upper side wall section 15 is in particular a 90° downward bend which forms the transition between the back 2 and the central side wall section 16 adjoining the upper side wall section 15, The central side wall section 16, adjacent to the first end section 7, is in terms of area the largest portion of the respective side wall 4. A lower side wall section 17 connects to the lower end of the respective side wall 4 and terminates at the flanges 13, 14 projecting from the central side wall section 16. With respect to the vertical direction of the side wall 4, the lower side wall section 17 is the section with the smallest height variations in each section plane. In addition, a bottom side of the control arm 1 extends essentially straight, while the top side with the back 2 and the spring plate region 12 is more contoured.

Figure 6:
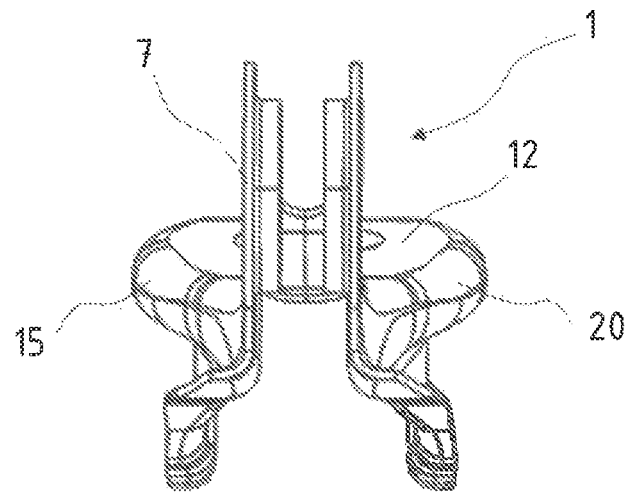
FIG. 6 shows the spring control arm of FIG. 1 in an end view onto a first end section.
Figure 7:
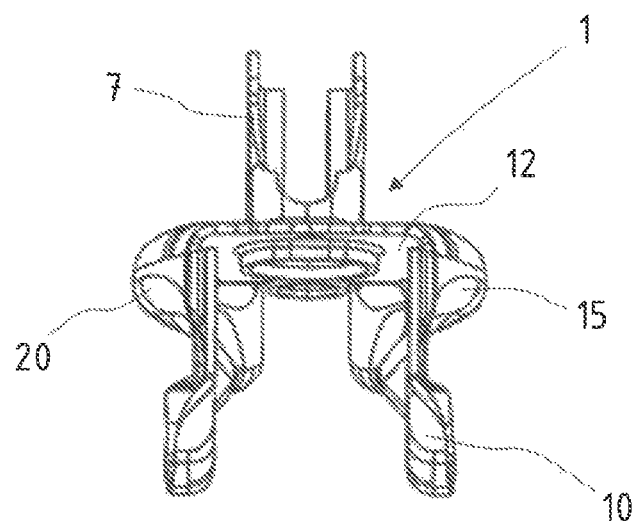
FIG. 7 shows the spring control arm of FIG. 1 in an end view onto the opposite, second end section.
Figure 12:
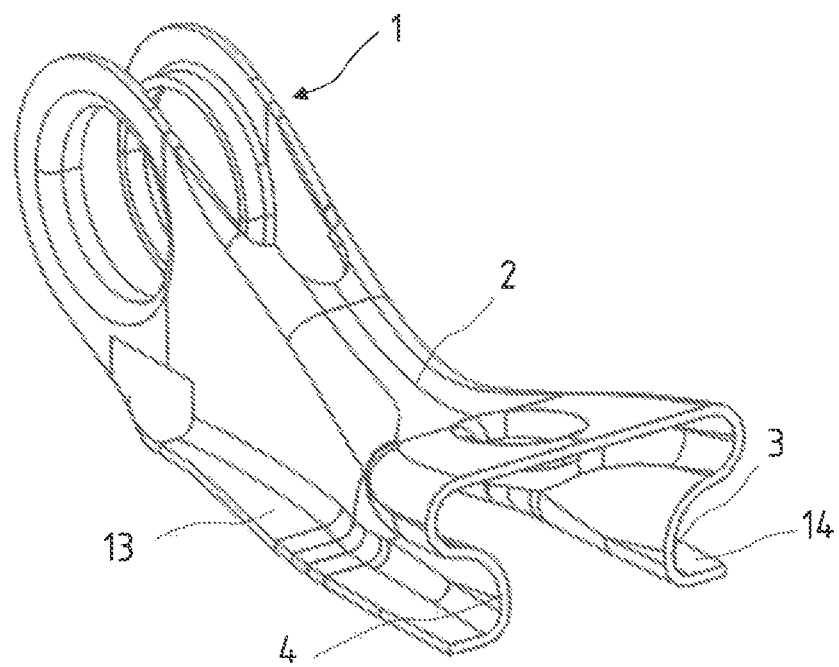
FIG. 12 shows a cross section along the section line XII-XII in FIG. 5.
Figure 13:
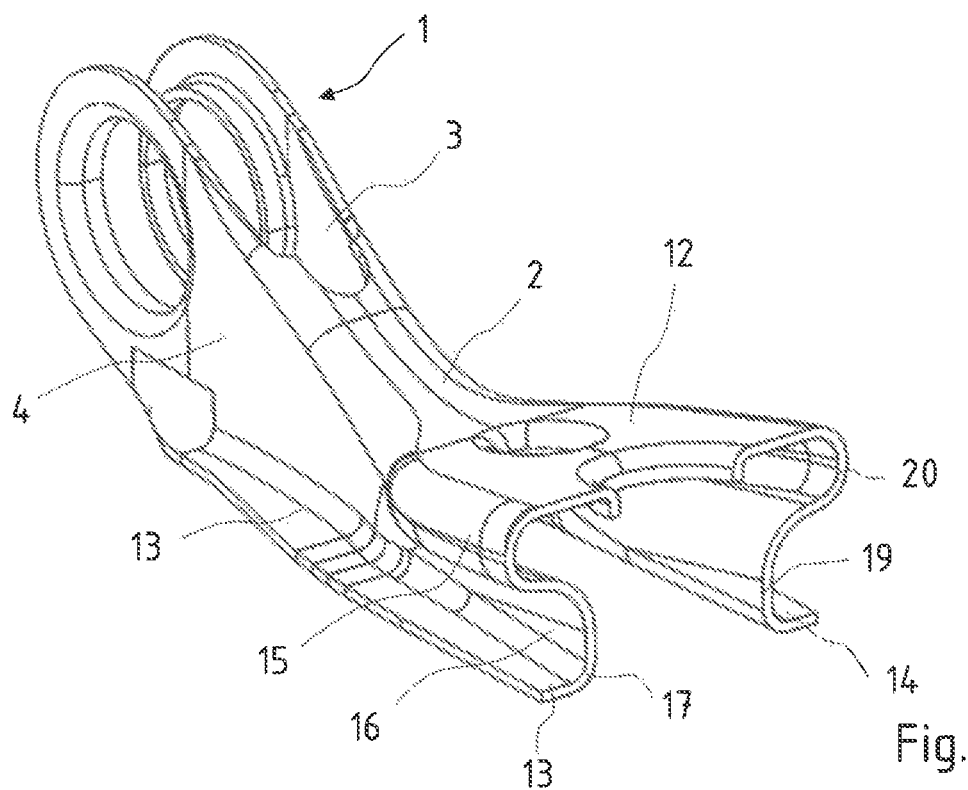
FIG. 13 shows a cross section along the section line XIII-XIII in FIG. 5.

As shown in the sectional diagrams of FIGS. 9 to 15, the central side wall section is perpendicular to the back 2. The width of the flanges 13, 14 also barely changes in the longitudinal direction L. Although the spring control arm 1 becomes essentially continuously wider from the first end section 7 toward the second end section 10, the relative changes in width in relation to a specific longitudinal section are smaller in the region of the lower side wall sections 17 than in the upper region of the spring control arm 1, This can also be seen from FIGS. 6 and 7. The two end views show that the bottom height region of the spring arm 1 is far less contoured than the upper height region. The upper height region refers in particular to the respective upper side wall section 15, 20, which adjoins the back 2 or spring plate region 12. FIG. 6 shows that the upper side wall regions 15, 20 are bead-shaped, relatively voluminous outwardly projecting bulges which start tangentially from the top spring plate region 12 and initially cause a significant lateral widening, and are then bent downwards and towards the central longitudinal axis of the spring control arm 1 by more than 90° and in particular by 180° with a large radius. The section planes XII and XIII of FIGS. 12 and 13 show that the lateral extension or the width of the spring plate region 12 decreases smoothly and continuously towards the end section 10.

The central side wall regions 16 extend essentially straight in the longitudinal direction L of the spring control arm 1. This is shown in particular in FIG. 8, which shows a section plane VIII-VIII through FIG. 5. The section plane VIII-VIII extends through the central side wall regions 16, 19. The two central side wall regions 18, 19 begin at the first end section 7 of the spring control arm 1 and initially extend essentially parallel to one another. In the longitudinal section L1, i.e. in the spring plate region 12, the two individual central side wall regions 16, 19 are also straight, but are no longer parallel to one another. The longitudinal section L1 denotes the region which is omega-shaped, as is evident from the fact that the upper side wall section 15, 20 projects in each case in the transverse direction over the central side wall sections 16, 19.

In a longitudinal section L2, which adjoins the longitudinal section L1 in the direction of the first end section 7 of the spring control arm 1 (FIG. 8), the cross section is hat-shaped. In this U-shaped or hat-shaped longitudinal section L2, the respective upper side wall section 15, 20 does not yet protrude beyond the central side wall sections 16, 19. This distinguishes the hat-shaped longitudinal section L2 from the omega-shaped longitudinal section L1.

The longitudinal section L2, which has a hat-shaped cross section, can also be referred to as a transition section. The side walls 3, 4, which initially extend parallel to one another, each begin to curve outwards in this transition section. The distance increases slightly. The back 2 is also a little wider. This outward bend ends at the beginning of the longitudinal section L1.

In the longitudinal section L1, the side walls 3, 4 extend essentially straight, with the distance between the side walls 3, 4 slightly increasing thereafter. The side walls 3, 4 therefore extend at an acute angle to one another, while still being perpendicular to the spring plate region 12.

A further longitudinal section L3 adjoins the spring plate region 12, which has an omega-shaped cross section, or the longitudinal section L1 towards the second end section 10, in which the central side wall regions 16, 19 continue to run straight. A free cut 21 is disposed in the back 2 and extends almost over the entire width of the back 2. In this transition region (longitudinal section L3), the lateral overhang of the two upper side wall regions 15, 20 decreases continuously.

In the last longitudinal section L4, which extends to the end of the second end section 10 of the spring control arm 1, the side wags 3, 4 again extend essentially parallel to one another, like in the first end section 7 of the spring control arm 1. To this end, the respective side walls 3, 4 are slightly curved at the transition from the longitudinal section L3 to the longitudinal section L4.

In this last longitudinal section L4, the upper side wall regions 15, 20 also extend again parallel to one another (FIG. 1). Here, the back 2 is completely absent, so that the upper side wall regions 15, 20 no longer have any inward bends, as is the case in the spring plate region 12 or in the transition region L2.

Figure 8:
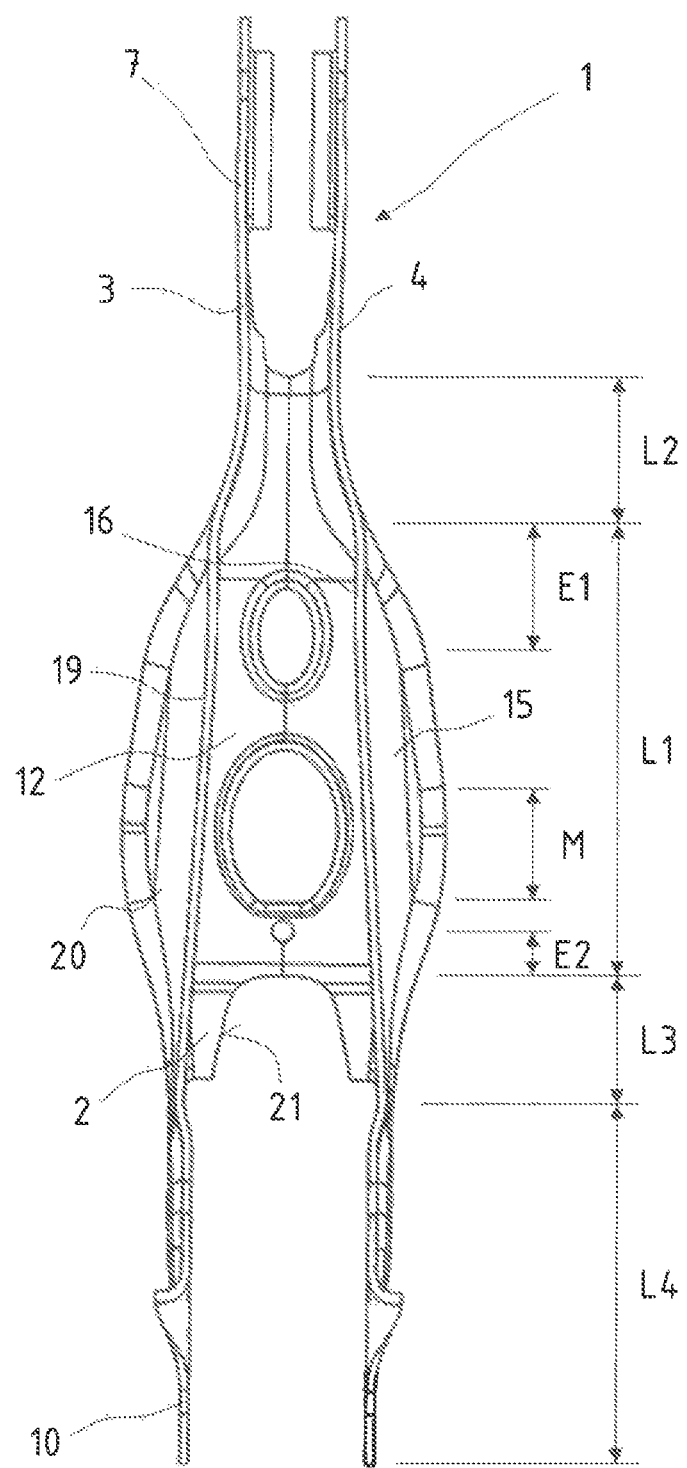
FIG. 8 shows a longitudinal section through the spring control arm of FIG. 1 along the section line VIII-VIII in FIG. 5.

FIG. 8 shows that the central longitudinal section L1 of the spring plate region 12 has three additional longitudinal sections M, E1, E2. A central longitudinal section M of the spring plate region 12 designates the region of maximum width B. It is located at a distance from the ends of the spring plate region 12. Also located at a distance from this central longitudinal section M are end-side longitudinal sections E1 and E2 of the spring plate region 12. They are located in the spring plate region 12. In these end-side longitudinal sections E1, E2, each width of the upper side wall sections 15, 20 is smaller than in the central longitudinal section M. Due to the substantially straight central side wall regions 16, 19, the omega shape is most pronounced where the difference in width between upper side wall section 15, 20 and central side wall section 16, 19 is greatest. This is the case in the central longitudinal section M.

Figure 3:
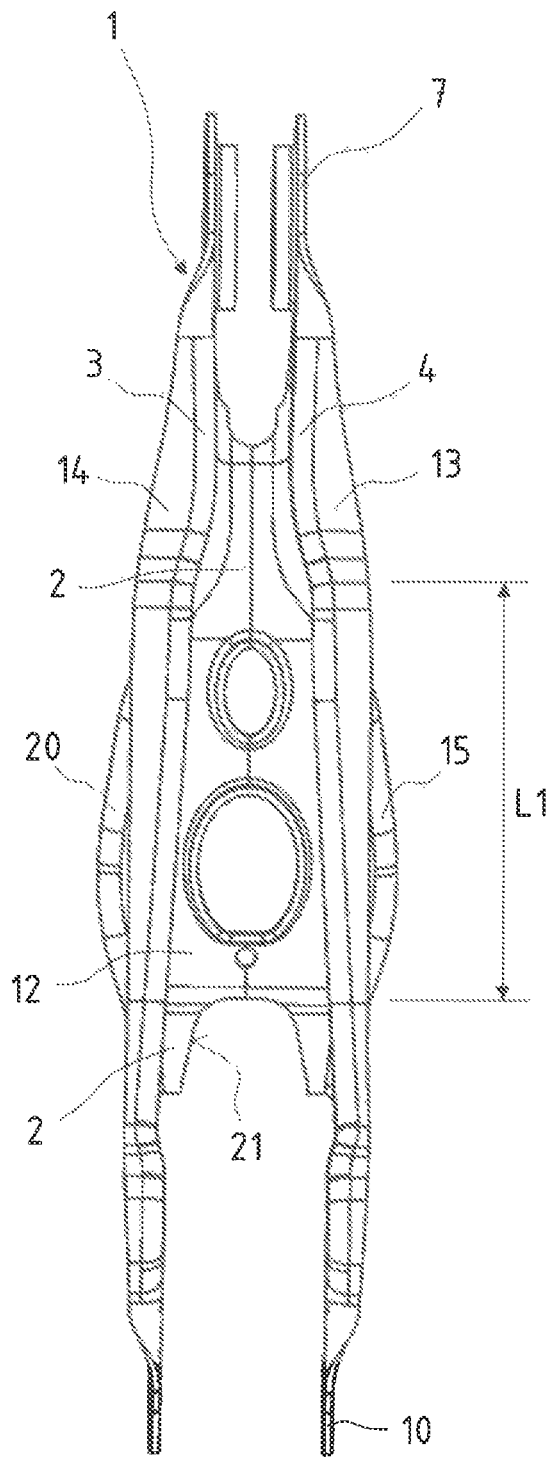
FIG. 3 shows the spring control arm of FIG. 1 in a view from below.

The width of the flanges 13, 14 also varies in the longitudinal direction L of the spring control arm 1. The diagram in FIG. 3 shows that the width of the flanges 13, 14 increases continuously, starting from the first end section 7, and has its greatest width in the transition region L2 (see FIG. 8). The flanges 13, 14 are also the widest region of the entire spring control arm 1. Their width decreases in the further course towards the second end section 10 and is even smaller than the width of the widened spring plate region 12. FIG. 3 shows that the upper side wall sections 15, 20 still protrude laterally beyond the flanges 13, 14 in the spring plate region 12. This changes again in the longitudinal sections L3 and L4, where there is no longer a continued omega-shaped cross section, because the back 2 has the free cut 21.

Figure 16:
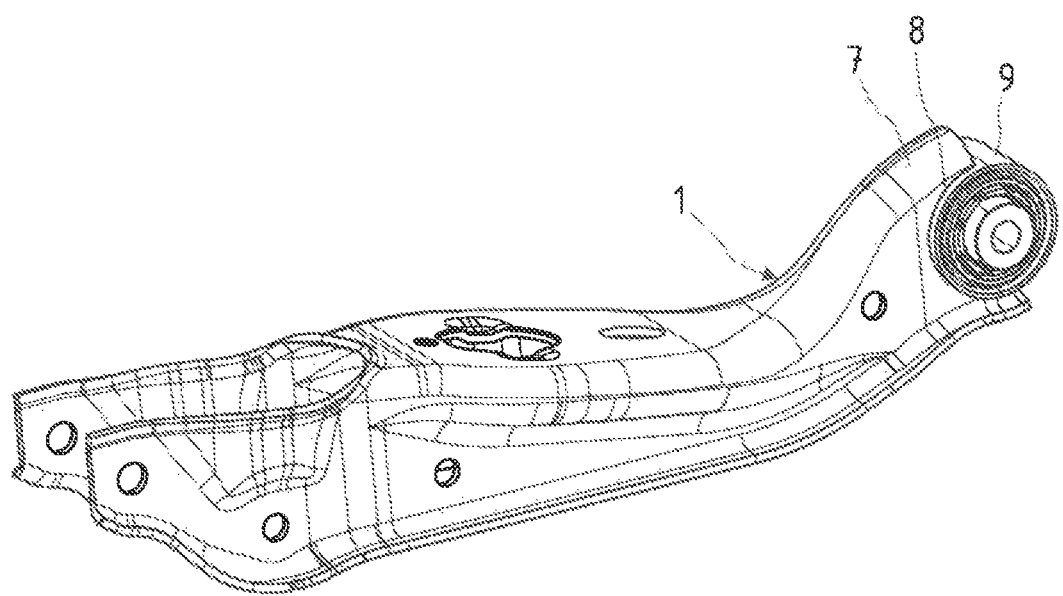
FIG. 16 shows a perspective view of another embodiment of a spring control arm according to the present invention.

FIG. 16 shows a further exemplary embodiment of a spring control arm 1, which is quite similar in its basic configuration to the spring control arm described above. Therefore, reference is made to the preceding description for FIGS. 1 to 15 for substantially identical components. The main difference lies in the differently designed end section 7. Here again, a bearing sleeve 9 is accommodated in a bearing receptacle 8; however, the bearing sleeve 9 is welded in and not pressed in. The bearing receptacle 8 also does not completely encompass the bearing sleeve 9 either. The bearing receptacle 8 is designed with a fork shape and is open to the first end section 7, so that the bearing sleeve 9 and not the bearing receptacle 8 forms the outermost end region of the spring control arm 1. The bearing receptacle 8 encompasses the bearing sleeve 9 in a circumferential region which is not greater than 180° and in particular is exactly 180°. The bearing sleeve 9 can therefore be inserted from the outermost end of the end section 7 into the bearing receptacle 8 and welded to it. A rubber-metal bearing is arranged in the bearing sleeve 9.

It can also be seen that openings with a slightly different cross-sectional contour and lateral beads are arranged in the spring plate region to adapt to different spring types or spring pads.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A spring control arm formed as a single-shell sheet metal part from a steel sheet for a wheel suspension of a motor vehicle, said spring control arm comprising:
   a back with a substantially U-shaped cross-section;
   side walls spaced from one another and connected to the back, with the side walls comprising
      an upper side wall region adjoining the back,
      a lower side wall region distal from the back, and
      a central side wall region arranged between the upper and the lower side wall regions,
   a first end section and a second end section for attaching the spring control arm; and
   a spring plate region with an enlarged width arranged between the first and second end sections, wherein the spring control arm has in the spring plate region a substantially omega-shaped cross section, which is more pronounced in a central longitudinal section of the spring plate region by virtue of further outwardly protruding upper side wall regions than in an end-side longitudinal section of the spring plate region.

2. The spring control arm of claim 1, wherein the central side wall region is substantially straight in a longitudinal direction of the spring control arm.

3. The spring control arm of claim 1, wherein the central side wall region is oriented substantially perpendicular to the spring plate region.

4. The spring control arm of claim 1, wherein the upper side wall region bulges outwards along a longitudinal direction of the spring control arm starting from the spring plate region.

5. The spring control arm of claim 1, wherein the lower side wall region has flanges pointing outwards in opposite directions.

6. The spring control arm of claim 1, wherein the cross section of the spring control arm is omega-shaped only in the spring plate region, with a U-shaped or hat-shaped longitudinal section adjoining the omega-shaped section.

7. The spring control arm of claim 1, wherein the side walls are spaced farther apart from each other at the second end section of the spring control arm than at the first end section of the spring control arm.

8. The spring control arm of claim 1, wherein the central side wall region, as viewed from the first end section to the second end section, extends substantially straight within the longitudinal section of the spring control arm having the omega-shaped cross section.

9. The spring control arm of claim 1, wherein the central side wall region, as viewed from the first end section to the second end section, extends substantially straight outside the longitudinal section of the spring control arm having the omega-shaped cross section.

10. The spring control arm of claim 1, wherein the central side wall region, as viewed from the first end section to the second end section, extends substantially parallel to each other outside the longitudinal section having an omega-shaped cross section.

* * * * *

UNITED STATES PATENT AND TRADEMARK OFFICE
CERTIFICATE OF CORRECTION

PATENT NO. : 11,376,911 B2
APPLICATION NO. : 16/837703
DATED : July 5, 2022
INVENTOR(S) : Friesen et al.

It is certified that error appears in the above-identified patent and that said Letters Patent is hereby corrected as shown below:

In the Specification

Column 2, Line 16: replace "summer" with --slimmer--.
Column 2, Line 55: replace "hi" with --in--.

Signed and Sealed this
Twenty-third Day of August, 2022

Katherine Kelly Vidal
*Director of the United States Patent and Trademark Office*